Figure 1:
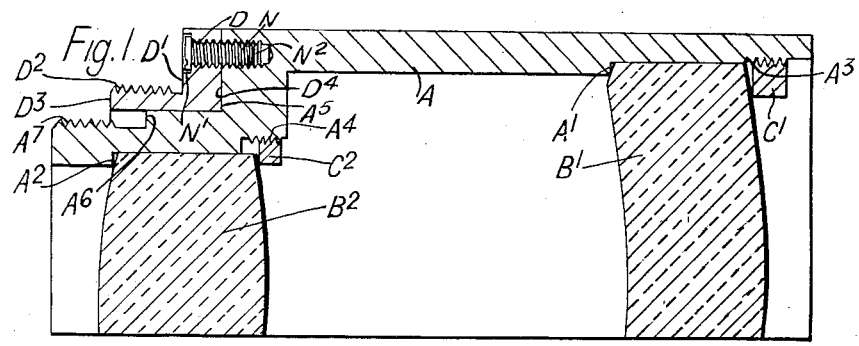

July 8, 1958 J. W. GEDDES 2,842,030
MOUNTS FOR PHOTOGRAPHIC LENSES
Filed Nov. 13, 1956 2 Sheets-Sheet 1

Inventor
John W. Geddes
By
Holcomb, Wetherill & Brisebois
Attorneys

July 8, 1958 J. W. GEDDES 2,842,030
MOUNTS FOR PHOTOGRAPHIC LENSES
Filed Nov. 13, 1956 2 Sheets-Sheet 2
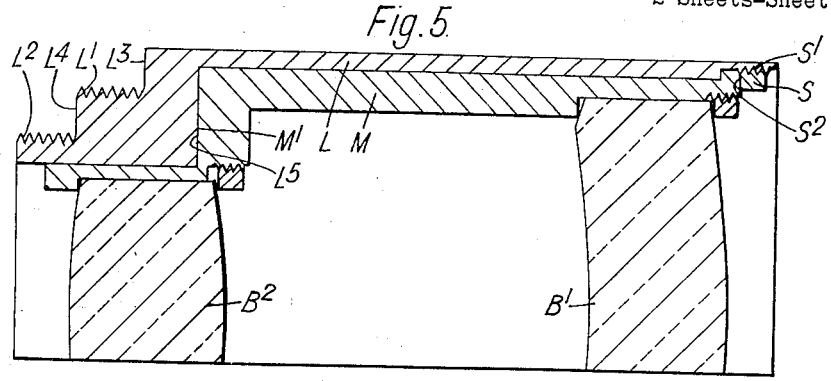
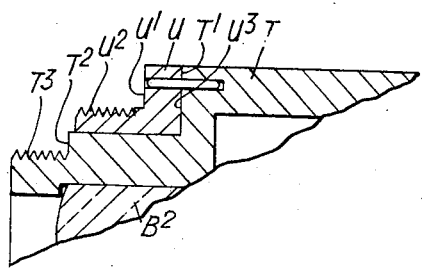
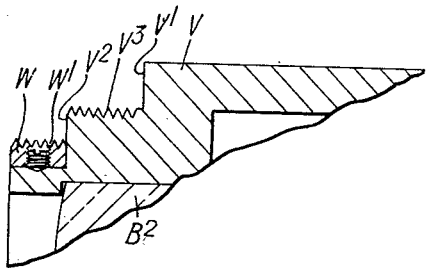
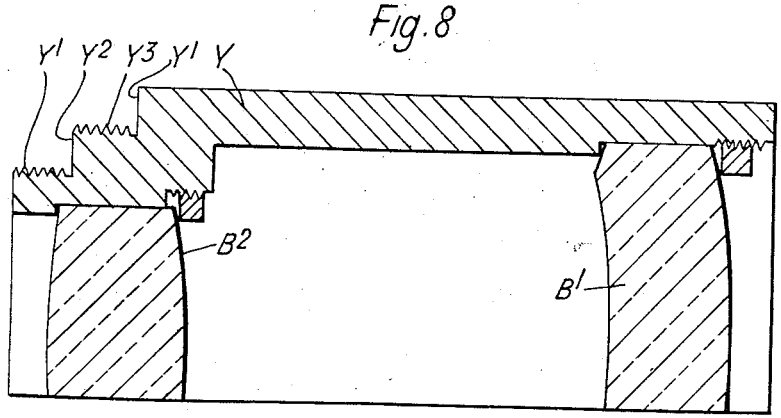
Inventor
*John W. Geddes*
By
Attorneys United States Patent Office 2,842,030
Patented July 8, 1958

2,842,030

MOUNTS FOR PHOTOGRAPHIC LENSES

John Walter Geddes, Leicester, England, assignor to Taylor, Taylor & Hobson Limited, Leicester, England, a company of Great Britain Application November 13, 1956, Serial No. 621,623

Claims priority, application Great Britain November 23, 1955

15 Claims. (Cl. 88—57)

This invention relates to a lens mount which can be fitted at will into either one of two cameras which use the same lens objective, but whose mechanical back foci are different. The term "mechanical back focus" as used herein, means the distance, measured along the optical axis of the camera, between the focal plane and the plane of the locating face or stop for the mount, and thus for the objective.

Hitherto, either separate mounts, each housing a similar objective, have been specifically made for each type of camera, or alternatively, a single mount has been provided with adapting means, such for example as an adaptor ring, so that it normally fits into one type of camera but after adaptation can be fitted into the other.

The object of the present invention is to provide an improved lens mount which can be fitted, without such adaptation into either one of two cameras.

A lens mount according to the present invention has two camera fittings, each of which comprises an external screwthread and a black flange face located at the end of the screwthread, the two screwthreads being coaxial and of different diameters, and the screwthread of larger diameter being positioned beyond the flange face for the screwthread of smaller diameter, such screwthread diameter being equal to or greater than the maximum diameter of such flange face, whereby the lens mount can be fitted at will into either one of two cameras appropriate to the fittings. It is to be appreciated that, when the mount is fitted into one of the two cameras, the appropriate back flange face will be located against the locating face or stop on the camera, which may for example be constituted by the front wall of the camera, the word "front," as used herein, being defined with respect to the objective as that side of the objective having the longer conjugate distance.

Preferably, the determination of the distance between the two back flange faces is effected by accurate machining of a separate member which is carried by the body of the lens mount in fixed relation thereto, such separate member carrying the larger screwthread and the back flange face for the smaller screwthread. In this case, the separate member may carry both back flange faces, or alternatively the separate member may carry a locating stop which engages with a flat face on the mount constituting the back flange face for the larger screwthread.

The separate member may have an internal screwthread engaging with a screwthread on the mount constituting the smaller screwthread. Alternatively, the separate member may itself carry the smaller screwthread.

A separate member may also be used in other ways. Thus, the distance between the two back flange faces may be determined as the sum of or difference between the distances between two accurately machined pairs of faces, one pair on the separate member, which is again carried by the mount in fixed relation thereto, and one pair on the body of the mount itself. Alternatively, however, the two back flange faces may be formed on an integral part of the body of the lens mount, in which case a separate member or members may or may not be used to carry one or both of the screwthreads respectively.

Preferably, whenever a separate member is employed, means are provided for locking such separate member in its correct position on the mount.

Figure 2:
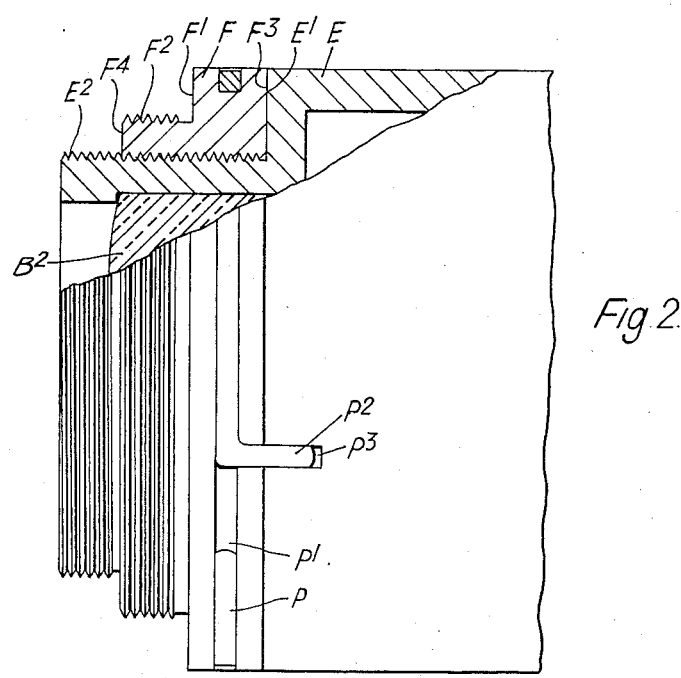
Figure 3:
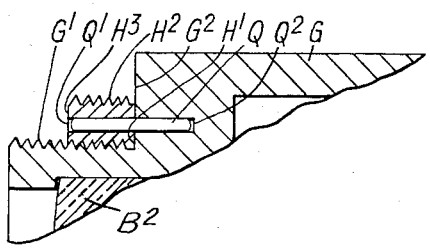
Figure 4:
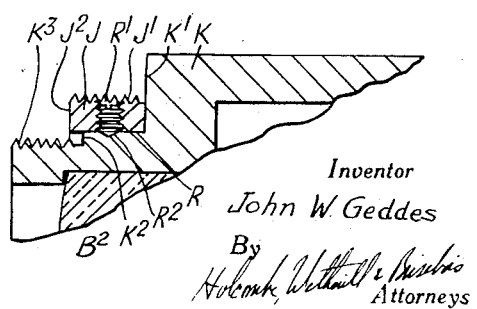

The invention may be carried into practice in various ways, but some alternative constructions of lens mount according thereto will now be described with reference to the accompanying drawings, in which Figure 1 shows the upper half of one construction in a section through the axis of the mount, Figure 2 shows, partly in elevation and partly in axial section, a modification of the arrangement of Figure 1, Figure 3 shows a portion of an alternative construction in axial section, Figure 4 shows the corresponding portion of a modification of the arrangement of Figure 3, Figure 5 shows the upper half of another construction in axial section, Figure 6 shows a portion of a further construction in axial section, Figure 7 shows the corresponding portion of another construction in axial section, and Figure 8 shows the upper half, in axial section of a construction not employing a separate member.

In the construction of Figure 1, the body of the mount comprises a tubular metal housing $A$ of circular section stepped internally at $A^1$ and $A^2$ to provide annular locating stops for the rear faces of two objective components $B^1$ and $B^2$. These two components are located accurately in the mount by locking rings $C^1$ and $C^2$ which are screwed up against the front faces of the components $B^1$ $B^2$ on internal screwthreads provided on the mount at $A^3$ and $A^4$.

Near its rear end the housing $A$ is externally stepped inwards at $A^5$ and $A^6$. The foremost annular face $A^5$ thus formed constitutes a stop face for an annular member $D$ which engages around the mount housing $A$ between the steps $A^5$ and $A^6$. The annular member $D$ is itself stepped inwards towards the rear of the mount to provide an annular flange face $D^1$ associated with a cylindrical portion provided with a screwthread $D^2$, while the rear end face of such member $D$ constitutes a second annular flange face $D^3$ for association with a screwthread $A^7$ which is provided on the cylindrical surface of the housing $A$ rearward of the step $A^6$. The member $D$ is accurately located with respect to the mount by engagement between two accurately machined surfaces, namely the foremost end face $D^4$ of the member and the stop face $A^5$ on the mount housing $A$.

The mount is suitable for fitting into either one of two cameras which use the same objective, but have different fittings for receiving the objective mount. The fitting on each camera comprises an internal screwthread and a machined locating face, which may for instance form part of the front wall of the camera, the axial distance between such face and the focal plane being known as the "mechanical back focus." The screwthreads on the two cameras are of different diameter, and the screwthread of smaller diameter is associated with the shorter mechanical back focus. The screwthread $A^7$ on the housing $A$ and the screwthread $D^2$ on the separate member $D$ respectively fit the two camera screwthreads. The two flange faces $D^1$ and $D^3$ on the member $D$ are accurately machined so that the axial distance between them is accurately equal to the difference between the mechanical back foci of the two cameras, and the axial distances of these faces from the machined face $D^4$ on the member $D$ are chosen to suit the position of the stop face $A^5$ relatively to the objective components $B^1$ and $B^2$, so that when the member $D$ is fitted on to the housing $A$ with the faces $D^4$ and $A^5$ in engagement the two flange faces $D^1$ and $D^3$ will lie accurately in the positions relative to the objective corresponding to the mechanical back foci of the two cameras. Thus, when the objective mount is used with one of the cameras, namely that with the smaller screwthread, the screwthread $A^7$ is screwed into such camera until the flange face $D^3$ engages with the locating flange on the camera, and the objective will then lie in exactly the correct position relatively to the focal plane in the camera. Similarly, with the other camera, the larger screwthread $D^2$ is screwed into the camera until the flange face $D^1$ engages with the locating face on the camera, in order to bring the objective into the correct position relatively to the focal plane in the camera.

In the construction shown in Figure 2, the objective components are similarly located in the mount, but the housing E is externally stepped only once at $E^1$, the annular face $E^1$ thus formed constituting a locating face for a separate member F which is screwed on to the housing over a screwthread $E^2$ provided on the housing E rearward of the step $E^1$. The separate member is stepped at $F^1$, the annular face $F^1$ thus formed constituting the back flange face for a screwthread $F^2$ cut on the member F to the rear of the step $F^1$. In this construction, the member F is fitted to the housing E by screwing on to the screwthread $E^2$, and the rear end face of the member F acts as a back flange face $F^4$ for the exposed rear end of the screwthread $E^2$ on the housing E, whilst its front end face $F^3$ locates itself accurately against the annular locating face $E^1$ on the housing E. As in the construction of Figure 1, the diameters of the screwthreads $E^2$, $F^2$ fit the screwthreads on the two cameras, and the flange faces $F^1$, $F^4$ are accurately machined in accordance with the mechanical back foci of the two cameras, these faces being machined in such positions with respect to the locating face $F^3$ as to be correctly located with respect to the objective when the member F is fitted to the housing E with the faces $F^3$ and $E^1$ in engagement.

In the construction of Figure 3, the separate member H has the form of a thick-walled hollow cylinder with screwthreads on its inner and outer surfaces, and is screwed on to a screwthread $G^1$ provided on the housing G, the front end face $H^1$ of the separate member locating itself against the annular flat face of a step $G^2$ on the outside of the housing G. This face $G^2$ in this case itself constitutes the back flange face for the screwthread $H^2$ provided on the outer surface of the member H, while the rear end face $H^3$ of such member acts as the back flange face for the rearmost end of the screwthread $G^1$.

A modification of this construction is shown in Figure 4, in which the separate member J slides over and engages closely around a cylindrical surface formed on the housing K between two steps $K^1$ $K^2$. The face of the front step $K^1$ constitutes the back flange face for the screwthread $J^1$ provided on the outer surface of the member J, whilst the rear end face $J^2$ of the member acts as the back flange face for a screwthread $K^3$ provided on the housing K to the rear of the step $K^2$, the member J being axially positioned by engagement of its front face $J^3$ with the step $K^1$. In both of these constructions, the faces $G^2$, $H^1$, $H^3$ or $K^1$, $J^2$, $J^3$ are accurately machined to lie in the correct positions with respect to the objective glasses to suit the mechanical back foci of the two cameras.

In the construction of Figure 5, the separate member is formed by a tubular casing L which fits around the housing M substantially over its whole length. The housing M is provided with one external step $M^1$ which acts as an annular locating face for the member L, while such member carries both screwthreads $L^1$, $L^2$ and the back flange faces $L^3$, $L^4$ therefor in the correct relationship. Thus such member is twice externally stepped at $L^3$ and $L^4$, the cylindrical portions immediately to the rear of such steps carrying the screwthreads $L^1$, $L^2$. Internally, the casing member L is provided with an internal step $L^5$ so as to provide a forwardly facing locating face which engages with the annular face $M^1$ on the housing M. As before the flange faces are all accurately machined so that, when the mount is fitted into either one of two cameras, the objective is correctly positioned in relation thereto.

In each of the five constructions described above, the determination of the distance between the two back flange faces has been effected by accurate machining of a separate member. However, a separate member may be used in other ways, one such way being shown by way of example in Figure 6. In this construction which is somewhat similar to that of Figure 1, the housing T is stepped twice at $T^1$ and $T^2$ and the separate member U is stepped once at $U^1$, such member U engaging around the mount housing T between the steps $T^1$ and $T^2$. Whereas, however, in the construction of Figure 1, the back flange face for the smaller screwthread is constituted by the rearmost end face of the separate member, the back flange face for such screwthread $T^3$ in this construction is constituted by the rearmost annular face formed by the step $T^2$. The back flange face for the larger screwthread $U^2$, which is carried by the separate member U is constituted by the annular step face $U^1$, the foremost annular step face $T^1$ on the housing acting as a locating face for such member U, engaging with its foremost end face $U^3$. Thus, the determination of the distance between the two back flange faces $T^2$, $U^1$, which is required to be equal to the difference in the mechanical back foci of the two cameras into either one of which the lens mount may be fitted, is effected by accurately machining two pairs of faces, the pair $T^1$, $T^2$ on the body of the mount and the pair $U^1$, $U^3$ on the separate member. It is to be appreciated that, although in the construction shown the distance between the two back flange faces is equal to the difference between the two pairs of faces, the separate member U may alternatively carry only the smaller screwthread and flange face therefor, in which case the sum of the distances between the pairs of faces determines the distance between the back flange faces, the faces again being so machined that this distance is equal to the difference in mechanical back foci of the two cameras.

A further example showing use of a separate member is given in the construction of Figure 7. In this construction the two back flange faces $V^1$, $V^2$ are formed on the body V of the mount, by means of two inward steps, the separate member W engaging around the body V rearward of the rearmost step face $V^2$ and carrying only the smaller screwthread $W^1$ while the larger screwthread $V^3$ is carried by the body V of the mount between the steps $V^1$, $V^2$. It is clear that in this construction the machining of the separate member W is not of primary importance, the accurate machining of the step faces $V^1$, $V^2$ on the body V effecting the determination of the distance between the back flange faces. It is also clear that, instead of carrying the smaller screwthread only, a separate member carrying only the larger screwthread may be employed, such member engaging around the body of the mount between the two step faces. Alternatively, two separate members may be employed, each carrying one of the screwthreads.

In each of the constructions described, the separate member is accurately located with respect to the mount housing by means of the engagement of two plane annular faces, one on the housing, and one on the separate member. In order to ensure permanence of such location during use, it is preferable to employ means for locking the separate member in position. Whilst cement or solder may be used to effect such locking, it will usually be preferred to employ mechanical locking means. Some such locking means are illustrated in Figures 1–5, but it will be appreciated that in no figure is the locking means shown specific to the particular construction shown, and that generally, any one of the locking means may be applied to any one of the constructions.

In Figure 1, the locking means comprises a pinning screw N, which screws through a countersunk hole $N^1$ in the annular face D¹ of the separate member D into a screwthreaded hole N² in the housing A.

In Figure 2, a wire spring P is provided for locking the separate member F in position. The wire is sprung into a circular groove P¹ provided in the cylindrical outer surface of the separate member F forward of the step F¹, one end P² of such wire P being bent at right angles to spring into a groove P³ provided in the surface of the housing E.

In Figure 3, the locking means comprises a dowel pin Q passing through hole Q¹ in the separate member H into a corresponding aligned hole Q² in the housing G.

In the construction of Figure 4, a grub screw R is employed, such screw being sunk into an internally screwthreaded radial hole R¹ provided in the cylindrical separate member J, and having a conical end which engages in an indentation R² provided in the cylindrical surface of the portion of the housing K between the steps K¹ and K².

In Figure 5, the locking means is provided at the foremost end of the mount. The tubular casing L projects beyond the front end of the housing M, and such projecting annulus is provided with an internal screwthread S¹ for receiving a locking ring S which is screwed up against the front end S² of the housing M in order to lock the member L in position.

Figures 6 and 7 show further examples respectively of the dowel pin of Figure 3 and the grub screw of Figure 4.

A further construction of lens mount is shown in Figure 8, in which a separate member is not employed. The two screwthreads and two flange faces therefor are provided on the housing Y itself, being machined accurately in position with respect to the objective components B¹ B² which are located in the housing Y in the same manner as in the previous constructions. Thus, the housing Y is provided with two external steps Y¹ Y² towards the rear end of the mount, the two cylindrical portions of the housing to the rear of the two annular faces Y¹ Y² thus formed being provided with the appropriate screwthreads Y³ Y⁴. Although this construction is more simple than those previously described, it is to be appreciated that when the mount incorporates focussing or other mechanisms, the design of the housing may be somewhat limited by the incorporation of such mechanisms, in which case a separate member will be preferably employed.

It is also to be appreciated that the constructions above described are by way of example only and that various modifications thereto are possible within the scope of the invention. Thus, the invention is not in any way limited to the use of any particular type of objective, and the construction of objective shown in the drawings is intended to be by way of example only.

What I claim as my invention and desire to secure by Letters Patent is:

1. A lens mount intended for alternative use with each of two types of camera requiring camera fittings of different sizes on the mount, including an external screw-thread constituting part of the first camera fitting, a back flange face located at the front end of the operative part of such screw-thread and also constituting part of the first camera fitting, a second external screwthread coaxial with the first screwthread and having a diameter not less than the maximum diameter of the same back flange face, the second screwthread being positioned in front of such back flange face, and a second back flange face located at the front end of the operative part of the second screwthread, the second screwthread and the second back flange face together constituting the second camera fitting.

2. A lens mount as claimed in claim 1, including a lens mount body bearing an accurately machined face constituting a locating face, a separate member bearing the second screwthread and two accurately formed faces one of which constitutes the first back flange face and the other a locating face, and means for securing the separate member to the lens mount body in a position in which the two locating faces are in engagement.

3. A lens mount as claimed in claim 2, in which the accurately formed face on the lens mount body also constitutes the second back flange face.

4. A lens mount as claimed in claim 3, in which the lens mount body bears an external screwthread constituting the first screwthread, and the separate member bears an internal screwthread engaging with such external screwthread.

5. A lens mount as claimed in claim 2, in which the lens mount body bears an external screwthread constituting the first screwthread, and the separate member bears an internal screwthread engaging with such external screwthread.

6. A lens mount as claimed in claim 2, in which the separate member also bears a third accurately formed face constituting the second back flange face.

7. A lens mount as claimed in claim 2, in which the separate member also bears the first screwthread.

8. A lens mount as claimed in claim 2, in which the separate member also bears the first screwthread and a third accurately formed face constituting the second back flange face.

9. A lens mount as claimed in claim 2, in which the lens mount body bears the first screwthread, and the separate member also bears a third accurately formed face constituting the second back flange face.

10. A lens mount as claimed in claim 1, including a lens mount body bearing the second screwthread and two accurately formed faces respectively constituting the first and second back flange faces.

11. A lens mount as claimed in claim 10, in which the lens mount body also bears the first screwthread.

12. A lens mount as claimed in claim 1, including a lens mount body having a pair of accurately formed faces one of which constitutes one of the back flange faces whilst the other constitutes a locating face, a separate member having a pair of accurately machined faces one of which constitutes the other back flange face whilst the other constitutes a locating face, and means for securing the separate member to the lens mount body in a position in which the two locating faces are in engagement.

13. A lens mount as claimed in claim 12, in which the lens mount body carries the first screwthread and the first back flange face, while the separate member carries the second screwthread and the second back flange face.

14. A lens mount as claimed in claim 1, including a lens mount body bearing an accurately formed face constituting a locating face, a separate member bearing an accurately machined face constituting a locating face, and means for securing the separate member to the lens mount body in a position in which the two locating faces are in engagement, the separate member and the lens mount body each bearing at least one of the four elements constituted by the two screwthreads and the two back flange faces together constituting the two camera fittings.

15. A lens mount as claimed in claim 2, in which the lens mount body bears an external screwthread constituting the first screwthread.

References Cited in the file of this patent

UNITED STATES PATENTS

| Number | Name | Date |
|---|---|---|
| 1,818,062 | Howell | Aug. 11, 1931 |
| 1,829,319 | Wheeler | Oct. 27, 1931 |
| 2,011,359 | Gaty | Aug. 13, 1935 |
| 2,026,724 | Wollensak | Jan. 7, 1936 |
| 2,027,411 | Whittaker | Jan. 14, 1936 |
| 2,502,788 | Hunter | Apr. 4, 1950 |
| 2,537,900 | Lee et al. | Jan. 9, 1951 |
| 2,556,546 | Lee | June 12, 1951 |